March 24, 1970     W. PUSTELNIK     3,502,343

SLIPPING CONE SEAL

Filed March 4, 1968

INVENTOR.
WERNER PUSTELNIK
BY Charles M. Hogan
Irwin P. Garfinkle
ATTORNEYS.

United States Patent Office 3,502,343
Patented Mar. 24, 1970

3,502,343
SLIPPING CONE SEAL
Werner Pustelnik, West Haven, Conn., assignor to
Avco Corporation, Stratford, Conn., a corporation
of Delaware
Filed Mar. 4, 1968, Ser. No. 710,305
Int. Cl. F16j 15/16; F16k 41/00
U.S. Cl. 277—25                                   5 Claims

ABSTRACT OF THE DISCLOSURE

A seal comprises two concentric piston rings having contacting complementary conical surfaces. The piston rings are axially spring biased. The outer piston ring is split. An axial spring fore is translated into axial and radial components, the radial component resulting from the relative movement between the adjacent conical surfaces. The seal is effective at zero speeds and has increased effectiveness due to centrifugal force at operating speeds.

SUMMARY OF THE INVENTION

This invention provides a seal which is effective at zero speeds as well as at high speeds. At zero or low speeds an axially applied spring force urges two contacting complementary conical piston-type rings axially against a rotating shoulder asd radially against a stationary housing. The outer ring is split and expands due to centrifugal forces as the speed of the rotor is increased. The expansion of the piston type ring permits the application of additional spring pressure to maintain the axial and radial seal contact pressures relatively constant. The inventive concept resides in the use of the contacting complementary concentric piston-type sealing rings, the outer one of which is split and both of which are axially loaded by a spring.

THE DRAWINGS

Figure 1:
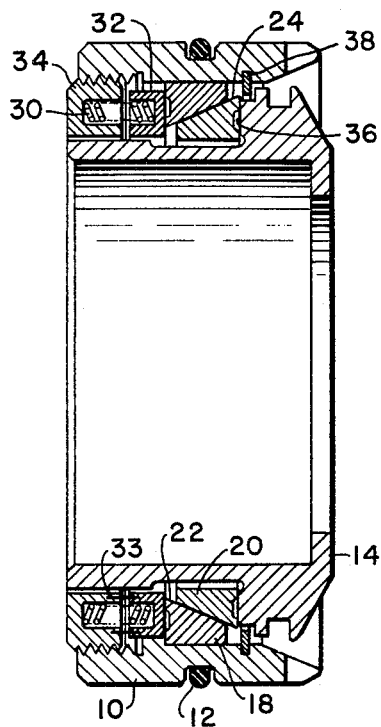
Figure 2:
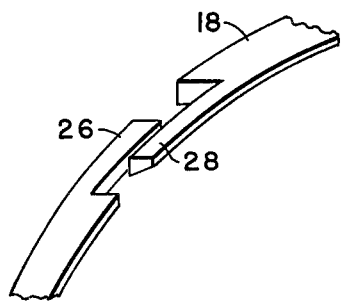

FIGURE 1 is a cross section of a seal utilizing the invention; and
FIGURE 2 is a view showing the split outer ring.

DESCRIPTION

The disclosed seal is contained within a stationary housing 10 provided with a conventional O-ring 12 for mounting in the casing of a machine such as a motor or an engine. A rotor 14 may be a separate sealing element which is mountable on a shaft or the rotor 14 may be the shaft of such a machine. Sealing between the rotor 14 and the stationary housing 10 is provided by means of two concentric seal rings 18 and 20. The seal rings 18 and 20 are provided with relatively movable complementary conical contacting surfaces 22 and 24, respectively. The outer ring 18 is split, as shown in FIGURE 2, but is provided in a conventional manner with overlapping abutting portions 26 and 28. The rings 18 and 20 are preloaded by means of springs 30 positioned within retainers 32. The springs and retainers are angularly locked in position by means of pins 33 extending into a lock nut 34. The lock nut 34 axially positions the springs. The retainer 32 is urged against the ring 18 which moves axially and radially with respect to the ring 20, this combined movement being due to the complementary conical surfaces 22 and 24. The axial movement forces the ring 20 against the sealing surface of shoulder 36 of the rotor 14 while the radial movement forces the outer periphery of the ring 18 against the inner periphery of the stationary housing 10.

A snap ring 38 positioned in the stationary housing 10 prevents the preloaded elements from being forced out of the housing when the rotor is not positioned therein.

In effect the seal operates like a spinning piston ring. At zero r.p.m. the preloaded retainer 32 bears against the conical rings 18 and 20 to provide both radial and axial sealing. As the speed of the rotor 14 increases, the radial sealing effect is increased by centrifugal force. This results from the expansion of the ring 18, the portions 26 and 28 of which are relatively movable. As the ring 18 expands, it moves radially against the stationary housing 10, but the springs 30 cause further axial movement against the ring 20 so as to maintain the preloading between the seal 20 and the surface 36 of the rotor 14.

The minimum theoretical angle of the conical surfaces is 22½ degrees. In practical applications this angle could be larger to prevent the rings from seizing. When rotating, the two carbon rings 18 and 20 will rotate with different speeds but will always be in balance as a function of the centrifugal forces transmitted between the rings 18 and 20 and the force of the springs 30. Depending on thermal and speed growth, there will always be a self-adjustment of the two rings 18 and 20 against the springs 30.

It will be apparent to persons skilled in the art that this invention is subject to various modifications and adaptations. It is intended therefore that the scope of the invention be limited only by the appended claims as interpreted in the light of the prior art.

I claim:
1. A seal comprising:
    an annular stationary housing;
    a rotor concentrically positioned within said housing, said rotor having a shoulder;
    an inner and an outer seal ring concentrically positioned in the space defined by said housing, said rotor and said shoulder, said rings having contracting complementary conical surfaces; and
    a plurality of springs axially preloading said rings, said springs axially urging the conical surface of said outer ring against the conical surface of said inner ring, whereby said outer ring is radially preloaded against said stationary housing and said inner ring is axially preloaded against said shoulder.
2. The invention as defined in claim 1 wherein a snap ring is provided for maintaining said seal rings within the housing when said rotor is not in position within said housing.
3. The invention as defined in claim 2 wherein one end of each said spring is contained within a retainer, each of said retainers being slidable on said outer ring, the other end of said spring being fixed to said housing.
4. The invention as defined in claim 3 wherein said other end of said spring is fixed to said housing by means of a lock nut internally threaded into said housing, said lock nut having an annular groove for receiving the other end of said springs.
5. The invention as defined in claim 1 wherein the outer seal ring is split.

References Cited

UNITED STATES PATENTS

| | | | |
|---|---|---|---|
| 1,120,181 | 12/1914 | Clement | 277—81 |
| 2,372,103 | 3/1945 | Morton | 277—25 |
| 2,889,159 | 6/1959 | Jensen | 277—40 |
| 3,165,323 | 6/1965 | Hamano | 277—41 |
| 3,250,539 | 5/1966 | Kurz et al. | 277—41 |

SAMUEL ROTHBERG, Primary Examiner

U.S. Cl. X.R.
277—41, 84